United States Patent [19]

Putman

[11] 4,247,316
[45] Jan. 27, 1981

[54] GAS SEPARATION FILTER DEVICE HAVING A HANDLE

[75] Inventor: William A. Putman, Louisville, Ky.

[73] Assignee: American Air Filter Company, Inc., Louisville, Ky.

[21] Appl. No.: 55,709

[22] Filed: Jul. 9, 1979

[51] Int. Cl.³ .............................................. B01D 46/10
[52] U.S. Cl. ........................................ 55/357; 55/492
[58] Field of Search ............... 55/357, 491, 492, 495, 55/511, 384; 160/DIG. 7; 210/470; 209/417, 420; 49/463; 52/19–21; 220/94 A

[56] References Cited

U.S. PATENT DOCUMENTS

| 1,854,677 | 4/1932 | Umensetter | 55/357 |
|---|---|---|---|
| 1,953,785 | 4/1934 | Sullivan | 55/357 |
| 2,778,445 | 1/1957 | Brixus | 55/357 |
| 3,343,345 | 9/1967 | Cardlan | 55/511 |
| 3,877,909 | 4/1975 | Hansen | 55/491 |

FOREIGN PATENT DOCUMENTS 103543  1/1964  Norway ............................... 55/DIG. 6

*Primary Examiner*—David L. Lacey
*Attorney, Agent, or Firm*—Jon C. Winger

[57] ABSTRACT

A gas separation device has a peripheral flow-through frame with a sheet of gas separation filter media disposed across the frame and attached to the frame for filtering a gas stream passing through the filter media. As an aid in installing and removing the gas separation device from an installation, one advantageous embodiment has a handle centrally disposed of and attached to the filter media and projecting from one face of the filter media while another advantageous embodiment has two handles centrally disposed of and attached to the filter media and projecting from opposite faces of the filter media.

6 Claims, 8 Drawing Figures

GAS SEPARATION FILTER DEVICE HAVING A HANDLE

BACKGROUND OF THE INVENTION

The present invention relates generally to gas separation devices or air filters and particularly to unit type air filters having handles to aid in the installing and removal of the filter in an installation, handles attached to filter device are known.

One example of a filter device having a handle is shown in U.S. Pat. No. 1,676,191 issued to A. Jordahl on July 3, 1928. This patent illustrates a filter having a peripheral frame surrounding a filtering material with a sheet of screen material disposed over both the upstream side and downstream side of the filter to hold the filtering material in place. A pair of handles are attached to the peripheral frame both projecting outwardly of the frame from the same side of the filter.

Another example of a filter device having a handle is shown in U.S. Pat. No. 3,523,409 issued to W. A. Paterson on Aug. 11, 1970. This patent illustrates a filter having a peripheral frame surrounding two layers of spaced apart sheets of filter media. A handle is attached to the peripheral margin of the frame to project outwardly of the peripheral margin so that the filter can be carried in the manner of a suitcase from place to place.

However, the type of handle illustrated in these patents are not suitble for many types of filter construction, and are relatively expensive.

A need exists for a handle construction which is suitable for an inexpensive disposable filter device which is intended to be thrown away when it becomes too contaminated for efficient filtering, and for filters which may not have an exposed frame structure.

Because filters of the throw-away variety are inexpensive, any handle construction must be extremely inexpensive to manufacture and assemble to the filter. Indeed, the cost must be negligible.

SUMMARY OF THE INVENTION

The present invention provides a handle eminently suitable for a disposable filter device and for filter devices which do not have an exposed frame.

More particularly, in one advantageous embodiment, the present invention is a gas separation filter device for separating particulate from a gas stream passing through the filter device, comprising:
a flow-through frame;
a sheet of gas separation filter media disposed across the flow-through frame and attached to the flow-through frame; and,
first handle means located on one side of the sheet of gas separation filter media and attached to the sheet of gas separation filter media for grasping by a human hand while installing and removing the gas separation filter device from an installation.

In another advantageous embodiment the present invention is a gas separation filter device for separating particulate from a gas stream passing through the filter device, comprising:
a flow-through frame;
a sheet of gas separation filter media disposed across the flow-through frame and attached to the flow-through frame;
first handle means located on one side of the sheet of gas separation filter media and attached to the sheet of gas separation filter media for grasping by a human hand while installing and removing the gas separation filter device from an installation; and
second handle means located on the other side of the sheet of gas separation filter media from the first handle means and attached to the sheet of gas separation filter media while installing and removing the gas separation filter device from an installation.

DESCRIPTION OF THE DRAWINGS

A better understanding of the present invention will be had upon reference to the following specification and appended drawing in which like numerals refer to like parts and wherein:

FIG. 6 is a cross-sectional view taken in the direction of arrows 6—6 in FIG. 4;

DETAILED DESCRIPTION

Figure 1:
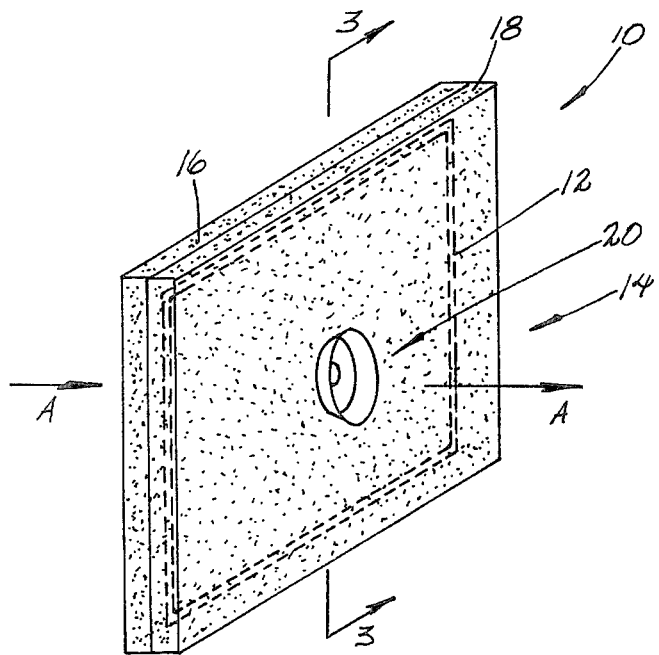
FIG. 1 is a perspective view showing one side of a gas separation filter device incorporating one advantageous embodiment of the present invention.

The present invention finds its best mode of use in what the industry calls a self-supporting or frameless filter. This terminology is somewhat misdescriptive because this type of filter really does have a frame and is not really self-supporting. However, the frame of a self-supporting or frameless filter is not exposed and, therefore, its presence is not evident upon casual examination.

A typical self-supporting or frameless filter device is illustrated in FIGS. 1-6 and is denoted generally as the numeral 10. The frameless filter device 10 includes a flow-through frame 12 and a sheet of gas separation filter media 14 disposed across the frame 12 and attached to the frame 12. The filter media 14 functions to separate particulates out of a gas stream as the gas stream passes through the filter device 10 as illustrated by the arrows "A" in FIGS. 1-6.

The flow-through frame 12 is a closed loop of rigid material, such as a metal wire. The frame 12 is illustrated as being rectangular in peripheral shape although it may be of other shapes, such as circular. The peripheral shape of the filter ultimately is determined by the configuration of the installation in which the filter is to fit.

The sheet of gas separation filter media 14 is complimentary in peripheral shape with the flow-through frame 12, but is larger in size so that the sheet of gas separation filter media projects beyond the flow-through frame 12 on all sides. The sheet of gas separation filter media 14 can be single layered or multi-layered. The number of layers and physical properties of the layers is a function of the type of contaminants to be removed from the gas stream and the nature of the gas stream itself. In FIGS. 1–6, the sheet of gas separation filter media is comprised of two confronting layers or plies 16 and 18. The two layers 16 and 18 are disposed in confronting relationship with the flow-through frame 12 embedded at the interface of the layers.

The layers 16 and 18 forming the sheet 14 of filter media may be attached to the flow-through frame 12 by vertually any conventional or otherwise convenient method. For example, if the filter media 14 contains a thermoplastic material it can be attached to the flow-through frame 12 by heat sealing. Alternatively, the filter media 14 can be attached to the flow-through frame 12 by an appropriate adhesive material applied either to the frame or to the media in the vicinity of the frame 12.

Figure 2:
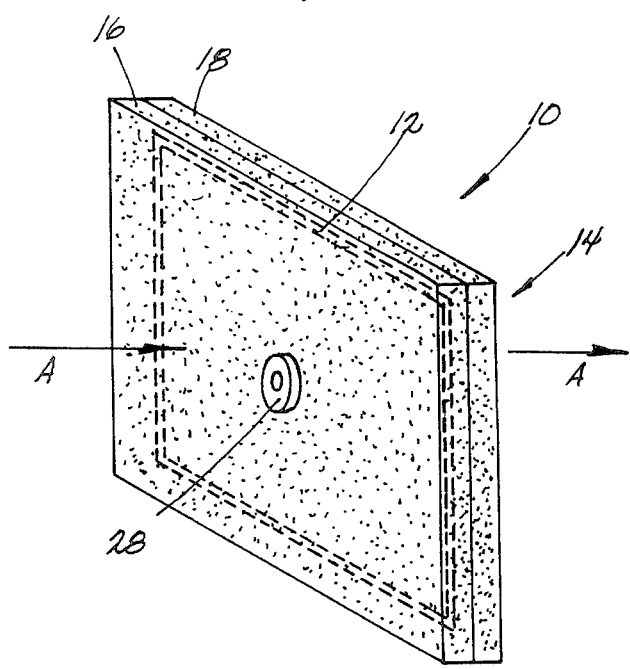
FIG. 2 is a perspective view of the filter device of FIG. 1, but showing the other side thereof.
Figure 3:
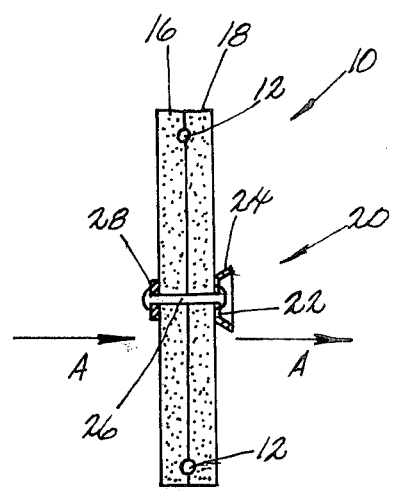
FIG. 3 is a cross-sectional view taken in the direction of arrows 3—3 of FIG. 1.

Now with reference to FIGS. 1–3, there is shown one advantageous embodiment of the present invention used with a typical frameless filter device 10. A handle 20 is located on one side or surface of the sheet of gas separation filter media 14, preferably the downstream side relative to the gas flow through the sheet of media. This handle 20 is preferrable geometrically centered on the side of the sheet of media 14, and is attached to the sheet of media.

Figure 7:
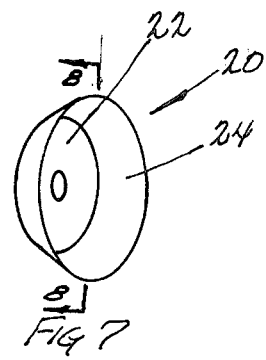
FIG. 7 is a perspective view of a component of the present invention common to both advantageous embodiments; and, FIG. 8 is a front view of the component of FIG. 7 as seen in the direction of arrows 8—8.
Figure 8:
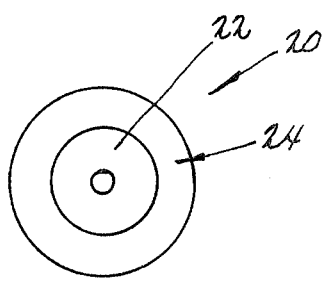

With continued reference to FIGS. 1–3 and additionally to FIGS. 7 and 8, the handle 20 comprises a base member 22 and a finger grasping member 24. The base member 22 is generally planar and of a generally circular peripheral shape. The finger grasping member 24 is a flange projecting from the base member 22. The flange 24 is illustrated as projecting from the periphery of the base member 22. The handle 20 can be fabricated of virtually any material. However, it has been found practical to mold the handle 20 out of a plastic material with the base member 22 integral with the finger grasping flange 24.

The handle 20 is situated on the side of the sheet of filter media with the planar base member 22 lying in the plane of and abutting the sheet of filter media 14 such that the finger grasping flange 24 projects ouwardly in a direction away from the sheet of filter media.

The handle 20 can be attached to the sheet of filter media 14 by virtually any convenient means. However, it has been found in practice that an elongated stem fastener 26, such as a pop rivet, works well. The pop rivet is connected at one of its ends to the base member 22, with its stem extending through the sheet of filter media 14 and has its other end connected to a keeper 28 which abuts the opposite surface of the sheet of filter media 14 from that surface against which the handle 20 is in abutment.

The keeper 28 can take vertually any shape. The most important criteria for its shape being that it will not pull through the sheet of filter media 14. In the illustrated embodiment, the keeper 28 is generally planar with a circular peripheral shape. The planar surface of the keeper 28 lies in confronting relationship with the abutting surface of the sheet of filter media 14, and the stem fastener 26 is connected at the geometric center of the keeper.

Figure 4:
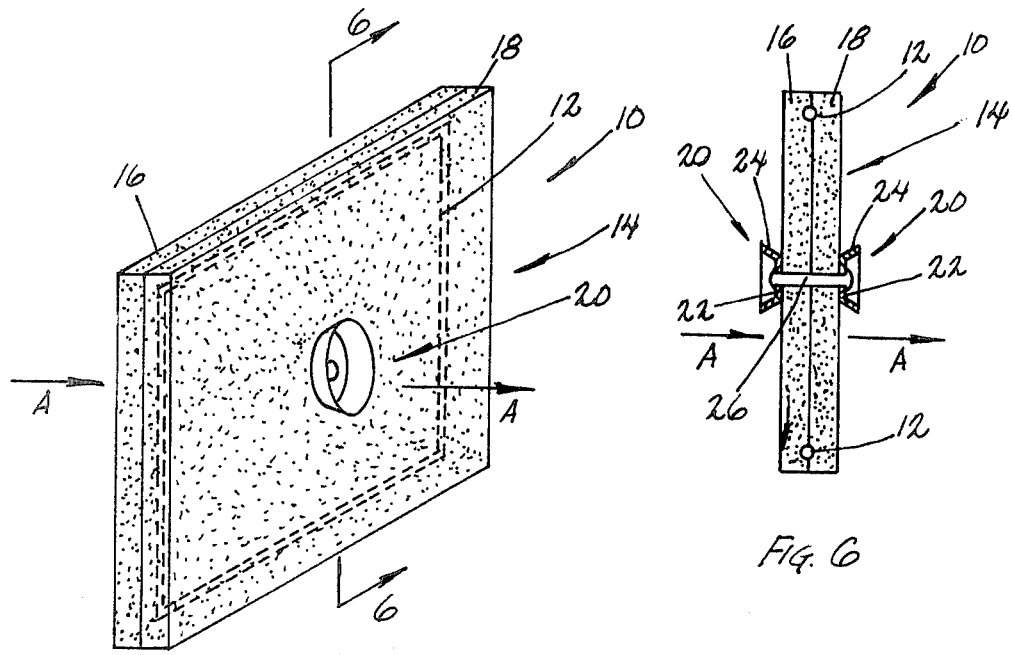
FIG. 4 is a perspective view showing one side of a gas separation filter device incorporating another advantageous embodiment of the present invention
Figure 5:
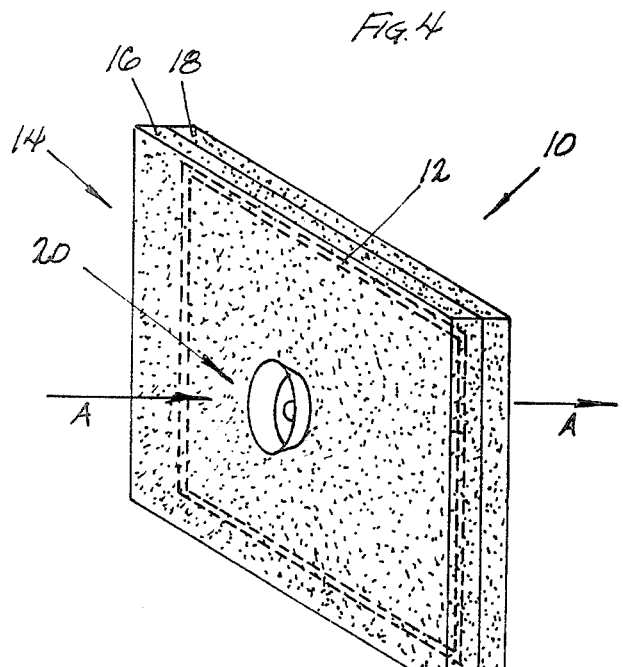
FIG. 5 is a perspective view of the filter device of FIG. 4, but showing the other side thereof.

Now with reference to FIGS. 4–6, there is shown another advantageous embodiment of the present invention also used with a typical frameless filter device 10. This embodiment comprises two identical handles 20. One of these handles, or a first handle, is disposed in abutting relationship to one side or surface of the sheet of filter media 14 and the other of these handles, or second handle, is disposed in abutting relationship to the opposite side of the sheet of filter media 14. Each handle 20 is preferably geometrically centered on its side of the sheet of filter media and is attached to the sheet of filter media.

As with the first embodiment, in the second embodiment the first and second handles are each situated on its respective side of the sheet of filter media with the planar base member 22 lying in the plane of and abutting the sheet of filter media such that the finger grasping flange 24 projects outwardly in a direction away from the sheet of filter media.

The first and second handles 20 can be attached to the sheet of filter media 14 by virtually any convenient means. However, it has been found in practice that an elongated stem fastener 26, such as a pop rivet, works well. The pop rivet 26 is connected at one of its ends to the base member 22 of say the first handle 20 with its stem extending through the sheet of filter media and has its other end connected to the base member 22 of the second handle 20.

The handle 20 in both advantageous embodiments is used when installing and removing the filter device from an installation and also when removing the filter device from a shipping carton.

The typical frameless filter 10 does not have any convenient hand hold because the sheet of filter media is stretched taut. Therefore, it can be somewhat difficult, or at least inconvenient to remove a filter from its shipping carton. The handle 20 of either of the disclosed embodiments makes it an easy matter to remove the filter from the shipping carton. All one has to do is grasp the handle 20. There is no fumbling around for a loose corner of the sheet of media to grab hold of, nor do the filter devices have to be dumped out of the filter carton in order to get a filter device.

The two handles 20 of the second advantageous embodiment have the additional convenience of allowing the filter devices to be conveniently removed from their shipping carton from either end of the carton. Thus, it makes no difference, from this standpoint, just how a shipping carton of filters may be oriented.

These advantages provided by the present invention may at first blush seem deminimus, however these advantages save time in removing filters from the shipping carton, and in storing cartons of filter devices, which results in a dollar saving over a period of time.

The handle 20 of both embodiments also has the advantage of making it easier and more convenient to install a filter in an installation. The person installing the filter need merely hold the filter by the handle with one hand. This is an especially convenient feature when the filter must be installed in an overhead location because the person installing the filter will have one hand free to perform the other functions required such as open and closing a door over area into which the filter will be installed.

Likewise, the handle 20 of both the embodiments has an additional advantage in removing a dirty filter from an installation. In addition to the fact that the handle allows one-handed removal with the attendant advantages discussed above regarding installation advantages, it also means that the person removing the filter device does not have to touch the dirty filter.

The foregoing detailed description is given primarily for clarity of understanding and no unnecessary limitations should be understood therefrom for modifications will be obvious to those skilled in the art upon reading this disclosure and may be made without departing from the spirit of the invention or the scope of the appended claims.

What is claimed is:

1. A gas separation filter device for separating particulate from a gas stream passing through the filter device, comprising:

A flow-through frame;

A sheet of gas separation filter media disposed across the flow-through frame and attached to the flow-through frame;

first handle means located on one side of the sheet of gas separation filter media and attached to the sheet of gas separation filter media, the first handle means is substantially geometrically, centrally disposed of the sheet of gas separation filter media an comprises a generally planer base member lying in the plane of and in abutment with the sheet of gas separation filter media and a finger grasping flange integrally formed with and projecting outwardly from the base member in a direction generally away from the gas separation filter media for grasping by the fingers of a hand while installing and removing the gas separation filter device from an installation; and, second handle means disposed on the other side of the sheet of gas separation filter media from the first handle means and attached to the sheet of gas separation filter media, the second handle means is substantially geometrically centrally disposed of the sheet of gas separation filter media and comprises a generally planer base member lying in the plane of and in abutment with the sheet of gas separation filter media and a finger grasping flange integrally formed with and projecting outwardly from the base member in a direction generally away from the gas separation filter media for grasping by the fingers of a hand while installing and removing the gas separation filter device from an installation.

2. The gas separation filter device of claim 1, wherein:

the first and second handle means are disposed opposite each other; and, the first and second handle means are connected to each other by connecting connection means through the sheet of gas separation filter media.

3. The gas separation filter device of claim 2, wherein:

the base member of the first handle means is generally circular in shape; and, the base member of the second handle means is generally circular in shape.

4. The gas separation filter of claim 3, wherein:

the flange for finger grasping of the first handle means project outwardly from the periphery of the generally circular base member of the first handle means and, the flange for finger grasping of the second handle means projects outwardly from the periphery of the generally circular base member of the second handle means.

5. The gas separation filter device of claim 4, wherein the first and second handle means are connected to each other at their base members.

6. The gas separation filter device of claim 5, wherein the flange of each of the handles projects at an angle to the side of the sheet of filter material.

* * * * *